UNITED STATES PATENT OFFICE.

WILLIS B. JOSLYN, OF WEST BAY CITY, MICHIGAN.

COMPOSITION FOR DESTROYING THISTLES.

SPECIFICATION forming part of Letters Patent No. 560,218, dated May 19, 1896.

Application filed July 13, 1895. Serial No. 555,914. (Specimens.)

*To all whom it may concern:*

Be it known that I, WILLIS B. JOSLYN, a citizen of the United States, residing at West Bay City, in the county of Bay and State of Michigan, have invented a new and useful Composition to be used for Destroying Thistles and such other undesirable vegetation as grows in yards, lawns, or pasture-fields or such other places as to become a detriment to the land and prevent the growth of a more desirable vegetation, of which the following is a specification.

My composition consists of the following ingredients combined in the proportions stated, by measurement, viz: five parts muriatic acid, commercial strength; one part strong lye, leached from wood-ashes; two parts of salt brine. These ingredients are to be thoroughly mingled by agitation.

In using the above-named composition it is put in a common ordinary sprinkling-pot and a small quantity sprinkled on the tops of the thistles, whereby the composition penetrates into the stalks and into the branches and works its way down to the roots, whereby in thirty hours' time it completely destroys the germ of the plant, leaving nothing to replenish or multiply.

What I claim, and desire to secure by Letters Patent of the United States, is—

The herein-described composition of matter to be used for destroying thistles, or such other undesirable vegetation, consisting of muriatic acid, strong lye, and salt brine, in proportions as specified.

WILLIS B. JOSLYN.

Witnesses:
   LEE E. JOSLYN,
   GENEVIEVE THOMAS.